United States Patent [19]

Heyer

[11] 4,310,295

[45] Jan. 12, 1982

[54] DEVICE FOR UNIFORM WEB PINNING

[75] Inventor: David E. Heyer, Circleville, Ohio

[73] Assignee: E. I. Du Pont de Nemours and Company, Wilmington, Del.

[21] Appl. No.: 229,159

[22] Filed: Jan. 28, 1981

[51] Int. Cl.³ .............................................. B29D 7/02
[52] U.S. Cl. .................................... 425/224; 264/556
[58] Field of Search .................. 425/224, 66; 264/556

[56] References Cited

U.S. PATENT DOCUMENTS

| 2,688,155 | 9/1954 | Nadeau et al. | |
| 2,714,745 | 8/1955 | Kenyon | |
| 3,347,962 | 10/1967 | Dieck et al. | |
| 3,520,964 | 7/1970 | Metz, Jr. | |
| 3,638,604 | 2/1972 | Herzhoff et al. | 118/50 |
| 3,645,773 | 2/1972 | Herzhoff et al. | 118/50 |
| 3,663,292 | 5/1972 | Herzhoff et al. | 118/50 |
| 3,735,729 | 5/1973 | Bird | 118/50 |
| 3,749,053 | 7/1973 | Timson | 118/50 |

FOREIGN PATENT DOCUMENTS 54-150477 11/1979 Japan .

Primary Examiner—James B. Lowe

[57] ABSTRACT

A device for uniform pinning of molten web material onto a quench roll by means of at least two vacuum zones interacting through a baffle, one vacuum zone extending past the line of contact of the web on the quench roll to encompass a portion of the web edge laid onto the casting drum.

5 Claims, 4 Drawing Figures

DEVICE FOR UNIFORM WEB PINNING

BACKGROUND

1. Field of the Invention

During the manufacture of many thermoplastic films, especially films of polyethylene terephthalate, a molten film web is cooled by extrusion onto a quench roll casting drum. Uniform pinning of the web to the quench roll is facilitated by the removal of air proximate the line of contact between the web and the quench roll by vacuum forces to eliminate such air from being trapped under the web during the lay-down so as to mitigate irregularities in the uniformity of cast sheeting, especially prominent at high speed operation. This invention is directed toward improvements in eliminating air pockets and reducing irregularities caused by air turbulence resulting from the vacuum forces applied to the line of contact between the quench roll and the web.

2. Description of Prior Art

In the production of film from certain thermoplastic polymers in which such film is formed at temperatures above or near the polymer melting point, it is important to quickly cool the freshly formed film to a temperature below the second order transition temperature, i.e., that temperature at which, as temperature decreases, the polymer goes from a flexible state to a more rigid, glassy state, in order to prevent crystallization which would interfere with subsequent orientation of the film. A number of devices have been employed to create more intimate contact between the web and the quench roll, the most prominent being, generally, forced air pinning, electrostatic pinning, and vacuum pinning. Forced air pinning, where the molten web is urged against the quench roll by means of air pressure exerted against the upper surface of the cast web, is of limited use during high speed operation due to film distortions created by air being trapped under the molten web as the web is laid onto the quench roll. Electrostatic pinning, where the cast web is held to the quench roll by means of electrostatic forces, has also been limited to slower operation as air bubbles are trapped under the web at high speeds.

In the recent past, the removal of the air proximate the contact line between the web and the quench roll has been attempted with partial success by vacuum forces which achieve varying degrees of uniformity in the pinning process. A major weakness in the use of these vacuum forces stems from air turbulence created by the vacuum, causing the web to vibrate as it flows onto the quench roll, such vibration resulting in a lack of uniformity in the casting and cooling process and hence, the web product. Prior art has exhibited some reduction of air turbulence by utilizing successive vacuum zones with porthole like interconnections or with individual vacuum forces, however, significant air turbulence at the line of contact between the web and the quench roll and consequent pinning and quenching irregularities remain. Further, in prior art devices, ambient air movement drawn past the edges of the extruded web, hereinafter "edge leak air", is essentially straight back, parallel with the movement of the casting drum. This leak air movement gives rise to significant air turbulence proximate the web edge bead and has been shown to bend the edge of the molten web back as the web is flowing from the die lip to the quench roll giving the web edge a scalloped appearance. This scalloping of the edge of the web before it is laid onto the quench roll is referred to herein as bead wobble. In prior art devices, edge leak air necessarily enters the vacuum zone proximate the molten web through the opening between the edge of the molten web and the vacuum device, thus, creating air turbulence within the device proximate the extruded web. Prior art devices, while mitigating air turbulence and, therefore, vibration of the extruded web, still leave much to be desired at high film manufacturing speeds. No prior suggestion of devices similar to this invention is known wherein there are two vacuum zones interracting only through a close fitting baffle, or skimmer;—one zone, hereinafter the primary zone, being proximate the line of contact of the web onto the casting drum, the other zone, hereinafter the secondary zone, being distal such line of contact relative to the primary zone, where the vacuum forces acting on the secondary zone do not create air turbulence within the primary zone due to the skimmer. Further, no prior suggestion is known to further mitigate bead wobble by extending the secondary zone to encompass both edges of the web as it is laid onto the drum by use of edge seals in conjunction with a quiescent vacuum zone such that the edge leak air drawn into the edge seal is substantially perpendicular to the movement of the casting drum.

SUMMARY OF THE INVENTION

During the pinning of molten cast web material onto a quench roll casting drum it is desirable to remove air from the contact line of the web and the casting drum so as to prevent air from being trapped under the web, while at the same time keeping the turbulence caused by such air removal at a minimum to attain uniform pinning of the web onto the drum. Accordingly, the present invention relates to a vacuum pinning device wherein extruded web material is uniformly pinned to a quench roll casting drum comprising: a vacuum shoe housing at least two interacting vacuum zones, primary and secondary; said primary zone located proximate the surface of the web at the line of contact between the web and the quench roll casting drum; said primary zone having a crevice which runs under a baffle fitted proximate the quench roll casting drum and joining the primary and secondary zones; said secondary zone positioned distal the line of contact between the web and the quench roll casting drum relative to the primary zone; said secondary zone having its outer perimeter surrounded by a proximity seal with the quench roll casting drum; said secondary zone having a vacuum source connected thereon, said vacuum source being the posterior vacuum source.

Further, the subject invention relates to an edge seal vacuum chamber, extending from and interconnected with the secondary zone, with one side open to a molten web edge as said web contacts the quench roll; said open side extending on both sides of the contact line of the web with the quench roll casting drum whereby the vacuum chamber encompasses a portion of the web on both sides of said contact line; said edge seal vacuum chamber having a vacuum source downstream from an extension of the die lip opening projected onto the surface of the quench roll relative to the movement of the drum, such vacuum source being the anterior vacuum source independent from the posterior vacuum source connected on the secondary zone; whereby the primary zone is quiescent relative to the secondary zone because the primary zone is isolated from turbulence caused by the posterior vacuum source by means of the baffle, and isolated from edge leak air by means of the edge seal vacuum chamber wherein said edge leak air is drawn into the edge seal vacuum chamber such that the edge leak air is drawn into the edge seal vacuum chamber substantially perpendicular to the movement of the casting drum.

DETAILED DESCRIPTION OF PREFERRED EMBODIMENT

Figure 1:
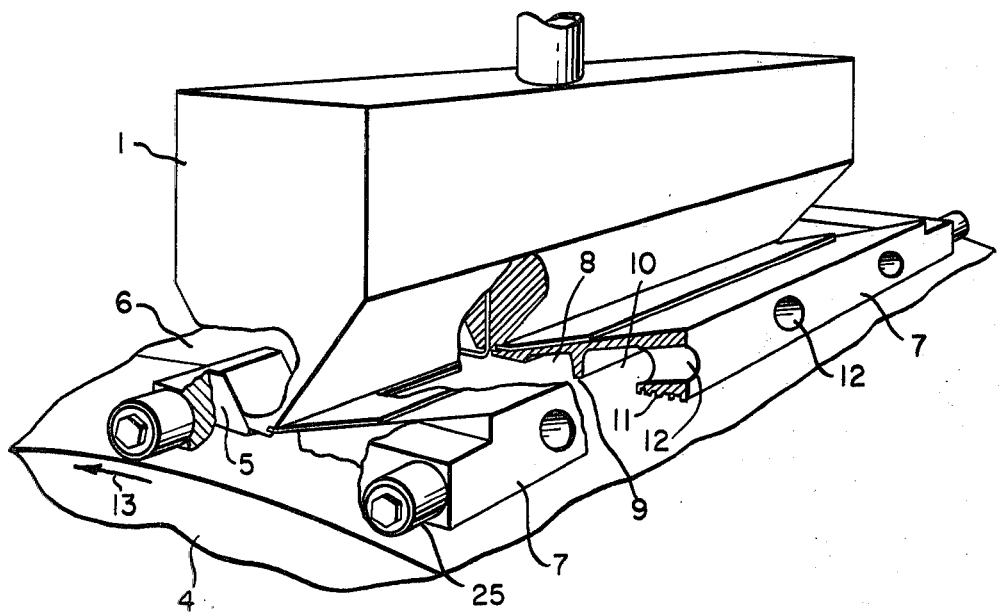
FIG. 1 is a perspective view of an embodiment of the subject invention.

In FIG. 1, molten thermoplastic web 6 is extruded through extrusion die 1 onto a quench roll casting drum 4 rotating in the direction of arrow 13. Other means of cooling the molten web may also be used such as a moving quench belt. FIG. 1 also depicts the perspective position of vacuum shoe 7, support rollers 25 and edge seal 5 relative to extrusion die 1. Further, the position of primary zone 8 is shown relative to baffle 9, secondary zone 10, labyrinth seal 11 and vacuum source 12.

Figure 2:
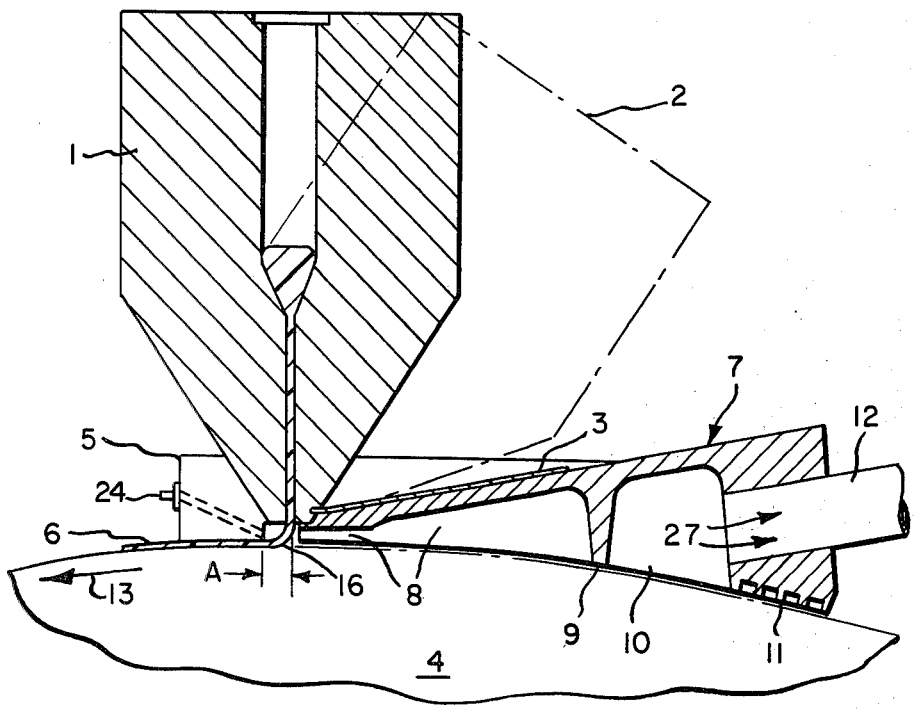
FIG. 2 is a cross section side view of an embodiment of the device of this invention.

In FIG. 2 extrusion die 1 can be positioned vertical with the radius of quench roll 4, as shown in FIG. 2, position 1, tilted backward toward the quench roll as indicated by the phantom outline identified in FIG. 2 as position 2, or any place between those locations. The preferred position is 2 which allows extrusion of web 6 to be more parallel with the movement of quench roll 4, such preferred position 2 accomodating the draw on the extruded web due to the rotation of the quench roll. Spring seal 3 supports the various positioning of extruder die 1.

In FIG. 2, vacuum shoe 7 houses two vacuum zones interacting only by way of baffle 9 fit closely to quench roll 4, such vacuum zones being designated as primary zone 8 and secondary zone 10. Primary zone 8 is proximate the surface of web 6 at line of contact 16 between web 6 and quench roll 4. Secondary zone 10 is distal the line of contact 16 relative to primary zone 8 with edge seals 5 fitted closely to quench roll 4 and serving as extensions of secondary zone 10 encompassing a portion of the edge of molten web 6 as it is laid onto quench roll 4 as said roll rotates in the direction of arrow 13. Edge seals 5 can be used independently without being interconnected with a vacuum zone such as secondary zone 10, for example with a single vacuum chamber device, as a vacuum chamber fitted closely to quench roll 4, with one side open to the molten web edge as said web contacts the quench roll, said open side extending on both sides of the contact line of the web with the quench roll and said edge seals having vacuum source 24 downstream from an extension of the die lip opening projected onto the quench roll, preferably a distance of 0.6 cm to 1.4 cm.

Figure 3:
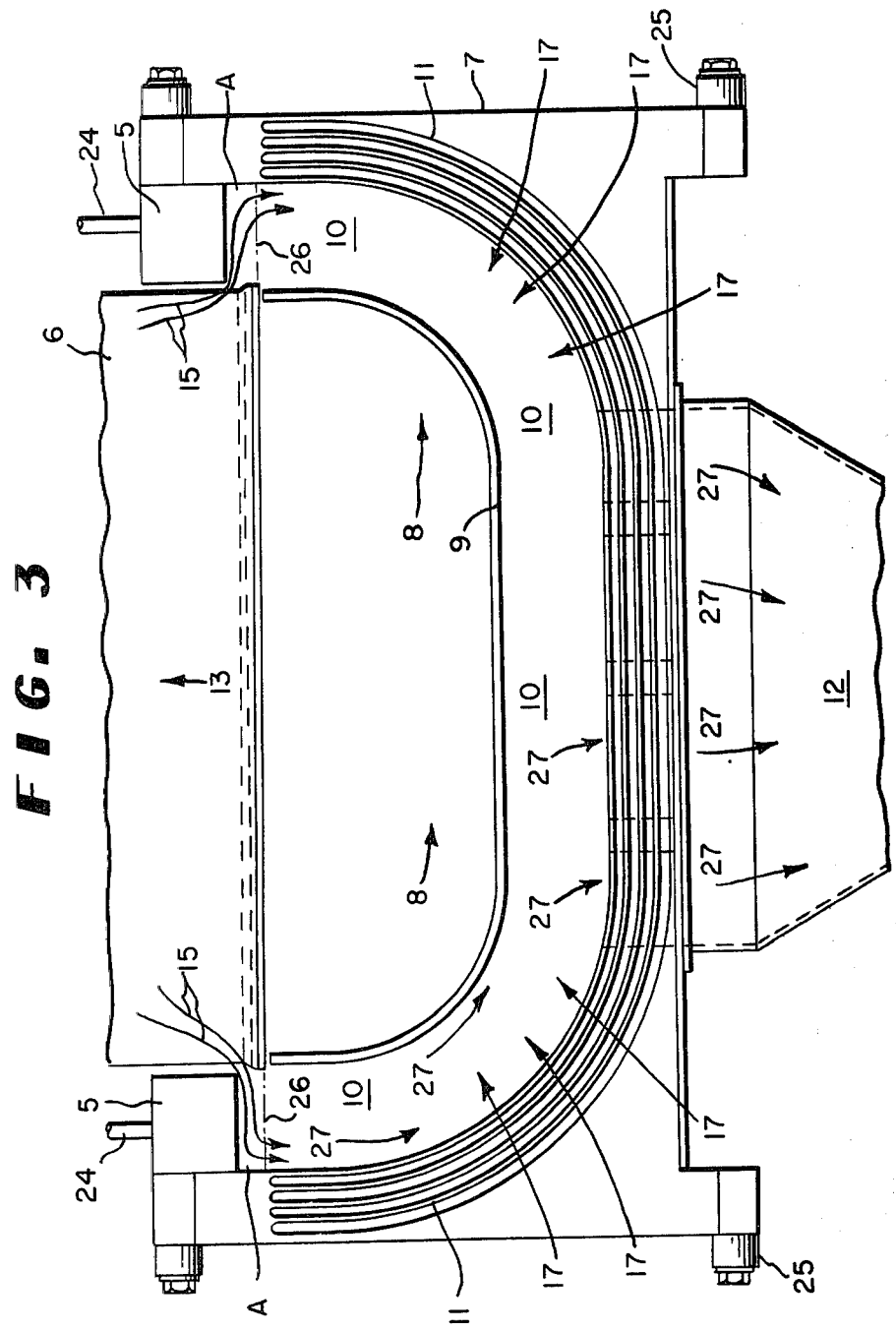
FIG. 3 is a bottom view of an embodiment of the device of this invention.

In FIG. 2 and FIG. 3 , secondary zone 10 is surrounded by a labyrinth seal 11 which forms a proximity seal between vacuum shoe 7 and quench drum 4 under which exists a crevice of from about 0.05 cm to 0.17 cm, maintained by contact of support rollers 25 with drum 4, such labyrinth seal 11 admitting perimeter leak air 17 into secondary zone 10. Primary zone 8 is located adjacent quench roll 4 to leave about a 0.05 cm to 0.17 cm crevice under skimmer 9 to join the primary zone 8 with secondary zone 10. Vacuum source 12 operates directly on secondary zone 10 drawing all leak air along paths 27 and out vacuum source 12, vacuum sources being applied to the primary zone 8 only through the crevice under the skimmer 9.

In FIG. 3 perimeter leak air is drawn under the labyrinth seal 11 into the seondary zone 10 along paths 17 and is exhausted via vacuum source 12, creating high air turbulence depicted by paths 27 in secondary zone 10. In contrast, perimeter leak air does not enter primary zone 8. The isolation of primary zone 8 is made nearly complete by the use of edge seal 5 in conjunction with the secondary vacuum zone. Edge seals 5 include vacuum source 24 which acts on zone A, an extension of secondary zone 10 further defined as that portion of edge seals 5 downstream from phantom line 26 drawn perpendicular to the movement of the quench roll as an extension of the die lip opening projected onto the surface of the drum into the edge seal. The vacuum force of vacuum source 24 is greater than that of vacuum source 12, the total effect being the creation of a slight pressure gradient between zone A and vacuum source 12, such that the path 15 of leak air is substantially perpendicular to the movement of the casting drum into zone A and then backward into the secondary zone. In contrast, without use of edge seal 5, vacuum source 12 acting alone causes edge leak air to be drawn essentially parallel to the movement of the quench roll into the primary zone, such air movement tending to create turbulence around the bead in the primary zone and hence tending to make unstable the edges of molten web 6 causing further bead wobble and associated lay-down instabilities. For maximum effect, edge seal 5 must be positioned such that vacuum source 24 penetrates zone A downstream from phantom line 26 relative to the movement of the quench roll, preferably a distance of 0.6 cm to 1.4 cm. This allows the cooperation of vacuum source 24 and vacuum source 12 to be of greatest effect in keeping edge leak air on paths 15 and away from the primary zone. Consequently, primary zone 8 is a quiescent zone and the molten web edges exhibit reduced bead wobble and hence lay uniformly onto the quench roll as said roll rotates in the direction of arrow 13.

Figure 4:
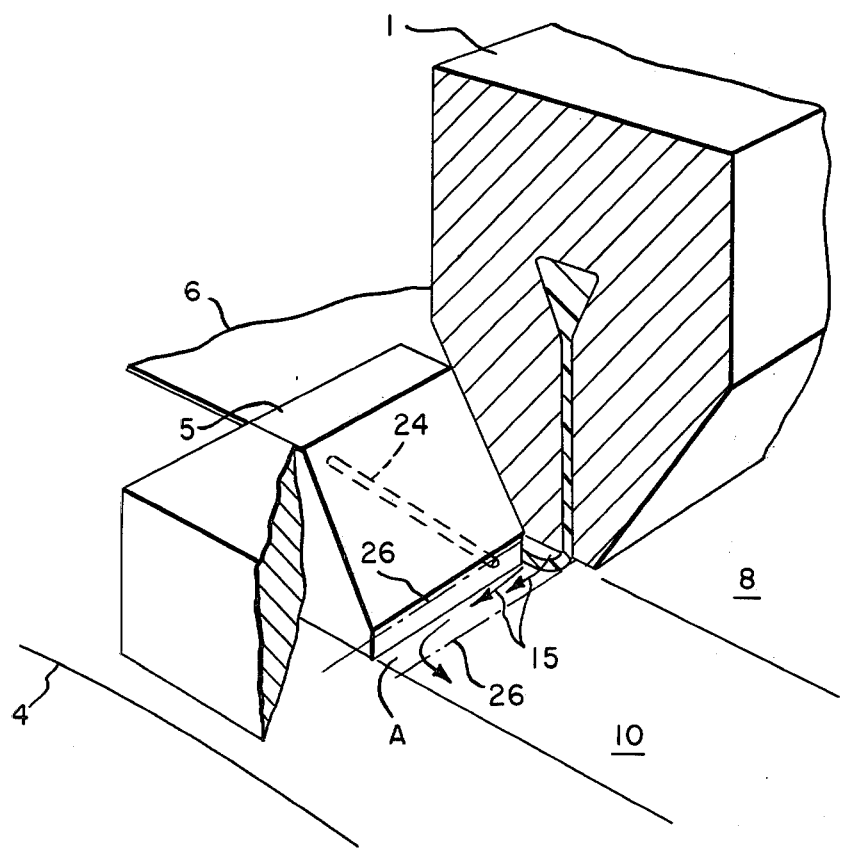
FIG. 4 is a aperspective view of the edge seal of the subject invention.

In FIG. 4 edge seal 5 is shown enlarged in perspective to web 6 as said web is extruded from extrusion die 1 to contact the quench roll 4. Phantom line 26 is an extention of the die lip opening projected onto the quench roll to define one side of zone A. Due to the influence of vacuum source 24, edge leak air is drawn away from the edge of web 6 along path 15 substantially perpendicular to the movement of drum 4 and into secondary zone 10. This cooperation between vacuum source 24 and secondary zone 10 eliminates edge leak air flow into primary zone 8 and stabilizes bead laydown.

EXAMPLE 1

Polyethylene terephthalate, having an intrinsic viscosity of about 0.53, is extruded at a rate of 408 kg/hour from a 50 cm ×0.18 cm slit die and cast on a quench roll spaced 0.317 cm from the die lip. Utilizing a device such as that depicted by the figures herein, a differential pressure of 1.57 m $H_2O$ is applied to the extruded web with vacuum sources 12, and a differential pressure of greater than 1.57 m H₂O is applied by vacuum source 24. At a take-off rate of 45.7 m/min the edges of the extruded web are stable. Pinning is complete and the appearance of the cast sheet is excellent.

EXAMPLE 2

Polyethylene terephthalate as in Example 1 is extruded at a rate of 408 kg/hour through a 25 cm × 0.23 cm slit die and cast on a quench roll spaced 0.317 cm below the die lip. Utilizing the device of Example 1, the differential pressure applied by vacuum source 12 is 2 m H₂O and that applied by vacuum source 24 is 4.57 m H₂O. At a take-off rate of 59.74 m/min, the edges of the extruded web show no tendency to wobble. Appearance of the cast sheet is excellent.

EXAMPLE 3

Example 2 is repeated except that the polymer extrusion rate is 499 kg/hour, the take-off rate is 80.16 m/min, and the differential pressure applied by vacuum source 12 is increased to 3.68 m H₂O. The quality of the resulting film product is similar to that of Example 2.

EXAMPLE 4

This comparative example is to show how an increased rate of extrusion creates excessive bead wobble when edge seals 5 are not employed.

The device of this example included two vacuum zones interconnected by means of a rectangular slot 1.27 cm × 63.5 cm cut in the wall separating the two zones. Polyethylene terephthalate melt is extruded at a rate of 272 kg/hour from a 50 cm × 0.18 cm slit die and cast on a rotating quench roll spaced 0.317 cm from the die lip. The web at the point of roll contact is subjected to a vacuum pressure of 50.8 cm H₂O created by vacuum source 12. No effort is made to restrict or in any way redirect the natural flow of leak air past the edges of the extruded web into the vacuum chambers. At a take-off rate of 45.7 m/min and a cast film thickness of 0.163 milimeters, the edges of the extruded web wobble in such a manner as to cause the cast film to be of nonuniform width. Increasing pressure and take-off rates increases wobble. Decreasing pressure and take-off rates decreases wobble. In contrast, the increase of pressure and take-off rates when using the device of the subject invention did not display such undesireable bead wobble.

EXAMPLE 5

In this comparative example, the same device as Example 4 is used under the following conditions: Die to drum gap—0.274 cm; die width—50.8 cm; rate of extrusion—272 kg/hour; quench roll speed 43.9 m/min; vacuum 50.8 cm H₂O. The device of the subject invention was then operated under similar conditions.

To determine the quality of pinning as a function of cast film thickness variation in the machine direction, peak to valley measurements are made at twenty consecutive points 7.5 centimeters apart and the measured thickness variations are averaged. The thickness variations in film cast using the subject invention is about 0.75 to 1.0% and, under similar conditions, but using the device of this comparative example, the thickness variation is about twice that value or 1.5 to 2.0%.

What is claimed is:

1. A device for uniformly and continuously pinning an extruded thermoplastic web to a quench roll comprising:

a vacuum shoe housing at least two interacting vacuum zones, primary and secondary;

said primary zone being proximate the surface of the web at the line of contact between the web and the quench roll;

said primary zone having a crevice which runs under a baffle fitted proximate the quench roll and joining the primary and secondary zones;

said secondary zone positioned distal the line of contact between the web and the quench roll relative to the primary zone;

said secondary zone having its outer perimeter surrounded by a proximity seal with the quench roll;

said secondary zone having a vacuum source connected thereon;

whereby the primary zone is quiescent relative to the secondary zone because the primary zone is isolated by the baffle from turbulence caused by the vacuum source.

2. A device for uniformly and continuously pinning an extruded thermoplastic web to a quench roll casting drum comprising:

an edge seal vacuum chamber with one side open to a molten web edge as said web contacts a quench roll;

said open side extending on both sides of the contact line of the web with the quench roll wherein the edge seal vacuum chamber encompasses a portion of the web on both sides of said contact line;

said edge seal vacuum chamber having a vacuum source downstream from an extension of the die lip opening projected onto the quench roll relative to the movement of the roll;

whereby, ambient leak air is drawn past the edges of the web into the vacuum chamber such that said leak air is not trapped under the molten web as the web is laid onto the quench roll.

3. The device of claim 2 wherein the vacuum source is from 0.6 cm to 1.4 cm downstream from the extension of the die lip opening projected onto the quench roll.

4. A vacuum pinning device wherein extruded web material is uniformly pinned to a quench roll, with vacuum sources of said device comprising posterior and anterior vacuum sources and, said device further comprising:

(a) a vacuum shoe housing at least two interacting vacuum zones, primary and secondary;

said primary zone located proximate the surface of the web at the line of contact between the web and the quench roll;

said primary zone having a crevice that which runs under a baffle fitted proximate the quench roll and joining the primary and secondary zones;

said secondary zone positioned distal the line of contact between the web and the quench roll relative to the primary zone;

said secondary zone having its outer perimeter surrounded by a proximity seal with the quench roll;

said secondary zone having a vacuum source connected thereon said vacuum source being the posterior vacuum source; and (b) an edge seal vacuum chamber, extending from and interconnected to the secondary zone, with one side open to a molten web edge as said web contacts the quench roll;

said open side extending on both sides of the contact line of the web with the quench roll whereby the vacuum chamber encompasses a portion of the web on both sides of said contact line;

said edge seal vacuum chamber having a vacuum source downstream from an extention of the die lip opening projected onto the quench roll relative to the movement of the roll, such vacuum source being the anterior vacuum source;

whereby the primary zone is quiescent relative to the secondary zone because the primary zone is isolated by the baffle from turbulence caused by the posterior vacuum source, and isolated from the edge leak air by the ancillary vacuum chamber wherein said leak air is drawn past the edges of the web into the ancillary vacuum chamber substantially perpendicular to the movement of the casting drum.

5. The device of claim 4 wherein the anterior vacuum source is from 0.6 to 1.4 cm downstream from the extension of the die lip opening projected onto the quench roll.

* * * * *